US010596663B2

(12) United States Patent
Ji et al.

(10) Patent No.: US 10,596,663 B2
(45) Date of Patent: Mar. 24, 2020

(54) HIGH-PRECISION LASER MACHINING METHOD FOR SAPPHIRE SUBMICRON-ORDER SECTION

(71) Applicant: Beijing University of Technology, Beijing (CN)

(72) Inventors: Lingfei Ji, Beijing (CN); Tianyang Yan, Beijing (CN); Lin Li, Beijing (CN); Na An, Beijing (CN); Zhenyuan Lin, Beijing (CN); Wenhao Wang, Beijing (CN)

(73) Assignee: Beijing University of Technology, Beijing (CN)

( * ) Notice: Subject to any disclaimer, the term of this patent is extended or adjusted under 35 U.S.C. 154(b) by 148 days.

(21) Appl. No.: 15/771,994

(22) PCT Filed: Mar. 24, 2017

(86) PCT No.: PCT/CN2017/078039
§ 371 (c)(1),
(2) Date: Apr. 27, 2018

(87) PCT Pub. No.: WO2018/165994
PCT Pub. Date: Sep. 20, 2018

(65) Prior Publication Data
US 2019/0366484 A1    Dec. 5, 2019

(30) Foreign Application Priority Data

Mar. 17, 2017    (CN) .......................... 2017 1 0158826

(51) Int. Cl.
*B23K 26/53*    (2014.01)
*B23K 26/70*    (2014.01)
(Continued)

(52) U.S. Cl.
CPC .............. *B23K 26/53* (2015.10); *B23K 26/70* (2015.10); *C03B 33/0222* (2013.01); *C03C 15/00* (2013.01); *B23K 2103/50* (2018.08)

(58) Field of Classification Search
CPC .... B23K 26/53; B23K 26/70; C03B 33/0222; C03C 15/00
(Continued)

(56) References Cited

U.S. PATENT DOCUMENTS

2013/0230912 A1\* 9/2013 Nukaga ................ B01J 19/0093
435/288.7
2017/0158550 A1\* 6/2017 Genier ............... B23K 26/0006
(Continued)

FOREIGN PATENT DOCUMENTS

CN    103418912 A    12/1899
CN    103952767 A    12/1899
(Continued)

*Primary Examiner* — Binh X Tran
(74) *Attorney, Agent, or Firm* — Zhihua Han; Wen IP LLC

(57) ABSTRACT

The present disclosure relates to a method for high precision laser processing of sapphire with submicron-order section plane using a picosecond-order pulse laser which has high transmittance wavelength to sapphire. The laser triggers ultrafine phase transformation points or electronic state removal points from a lower surface of sapphire. After elevating focal points, a trace which is parallel to laser incident direction is formed. Under a chemical corrosion environment, points of the laser trace are arranged to intersect with other another according to the cutting route to form the corresponding phase transformation region and electronic state removal region. At the same time, by utilizing the catalysis effect of microthermal effect of picosecond laser on chemical corrosion, separation of the sapphire sample along the processing path is obtained. The present disclosure overcomes the limitation of Gaussian beam
(Continued)

focusing mode and realizes high precision sapphire cutting with zero tapers and no heat-affected zone. Cutting of hyperfine sapphire and other materials with the high quality cutting surface in micron and submicron ranges with no limitation on the thickness and process path is achieved.

6 Claims, 1 Drawing Sheet

(51) Int. Cl.
*C03B 33/02* (2006.01)
*C03C 15/00* (2006.01)
*B23K 103/00* (2006.01)

(58) Field of Classification Search
USPC .......................................... 216/65, 101, 104
See application file for complete search history.

(56) References Cited

U.S. PATENT DOCUMENTS

| 2017/0189991 A1* | 7/2017 | Gollier ................. G02B 27/095 |
| 2017/0189999 A1* | 7/2017 | Bookbinder ........ C03B 33/0222 |
| 2018/0304352 A1* | 10/2018 | Mortensen ............. B22D 17/00 |

FOREIGN PATENT DOCUMENTS

| CN | 104959736 A | 12/1899 |
| CN | 105458515 A | 12/1899 |
| CN | 106392341 A | 12/1899 |
| JP | 2000353687 A | 12/1899 |
| WO | WO03049155 A | 12/1899 |

* cited by examiner

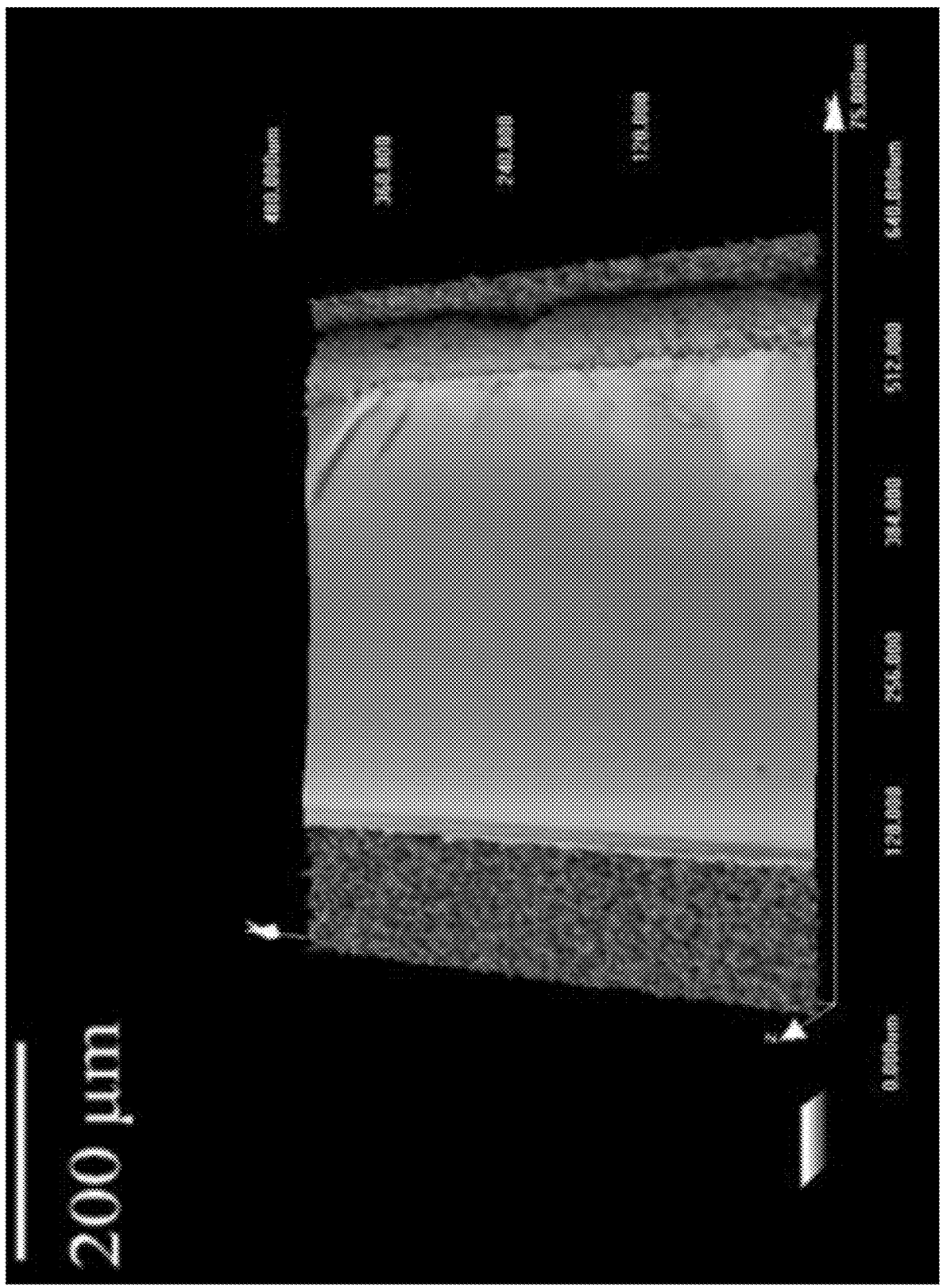

HIGH-PRECISION LASER MACHINING METHOD FOR SAPPHIRE SUBMICRON-ORDER SECTION

CROSS-REFERENCE TO RELATED APPLICATION

This application is a national stage application of International application number PCT/CN2017/078039, filed Mar. 24, 2017, titled "A method of high-precision laser processing sapphire with submicron cutting surface," which claims the priority benefit of Chinese Patent Application No. 201710158826.4, filed on Mar. 17, 2017, which is hereby incorporated by reference in its entirety.

TECHNICAL FIELD

The invention relates to a non-thermal-ablation laser cutting area of hard, brittle transparent materials, and particularly to a method for high precision laser processing of sapphire with submicron roughness cutting surface.

BACKGROUND

Sapphire is a single crystal aluminum oxide and has a Mohs hardness only lower than diamond. Due to the special mechanical, thermal, electrical properties as well as good radio-resistance, heat conduction, and stable chemical characteristics of sapphire, sapphire is widely used in the defense industry, aerospace research and civilian area. Conventional mechanical methods for sapphire cutting such as diamond wire-sawing typically suffer from low machining speed, machining freedom, processing quality, and accuracy. In addition, such contact-type cutting tools using diamond wires do not last long and have a high level of wastage. In contrast, laser cutting technology has high-energy density, and contactless features, the restrictions on the cutting requirements caused by the contact stress of machining tools are thus effectively avoided. However, for hard, brittle materials such as sapphire, laser cutting technology based on thermal ablation still cannot solve problems such as cracking, slagging, and collapsing, which adversely affect cutting depth, cutting width, surface roughness, select of cutting free path and cutting efficiency. As the advancement of sapphire application tends towards to a direction which requires thinner sapphire with higher surface quality and better damage resistance, it imposes an urgent and extremely difficult challenge to the fine cutting technique of sapphire. Technology breakthroughs are achieved in the cutting depth, kerf taper and cutting surface quality.

Chinese patent CN201510239300.X disclosed a method for obtaining crack direction and offset in sapphire laser cutting and adjusting laser machining position according to the crack direction and offset to finish the remaining cutting path. However, the cutting mechanism of this patent is still based on laser thermal ablation, in which sapphire chips with front and back electrodes are processed, and machining accuracy of cutting surface is not involved. Chinese patent CN201410204028.7 disclosed a compound sapphire processing method which involves processes of nanosecond laser heat treatment, ultrasonic chemical corrosion pretreatment, picosecond laser precision machining and post-ultrasonic abrasive polishing. These four processes are sequentially performed and are not performed simultaneously; Operation time of the four processes is long and tedious. Chinese patent CN201210290741.9 used picosecond ($10^{-12}$ s) and femtosecond ($10^{-15}$ s) laser. By focusing the laser beam on the surface of a transparent material and forming a waveguide structure with the incident beam, waveguide planar is formed by controlling the laser moving at a constant speed along the direction which perpendicular to the material surface. Waveguide area relates to refractive index change area of the material. and there is no material disruptive failure. However since different transparent materials are associated with different material systems and different crystal systems and structures, the practicability of using waveguide region to form material fracture surface is not generalizable. An embodiment of the patent is glass, and glass is amorphous. However, the sapphire used in the present application is much harder than glass. Chinese patent CN201410657880.X used 30-55 W picosecond laser to process sapphire surface by means of galvanometer scanning. It belongs to laser marking technology on the sapphire surface and does not involve cutting depth and precision. Chinese patent 201410379877.6, 201410380104.X and 201410380147.8 disclosed methods and apparatus for forming filaments in transparent materials using a laser. By generating multiple focal points by a distribution—type focus lens module such that the main focal point doesn't reside on the material being processed, holes with specific depth and width are generated through filamentation. German scientists Maren Hörstmann-Jungmann et al. disclosed forming microchannels on the sapphire surface or within sapphire by utilizing the nonlinear effect of a tight focused femtosecond laser, then generating hollow microstructures by chemical ultrasound (J. Laser Micro Nanoengineering, 2010, 5(2): 145-149). The depth of laser machining using this method is limited by laser focal depth. Also, the way of tight focusing femtosecond laser has to be followed by ultrasonic chemical processing. This method overcomes the limitation of machining depth by compensating power and improving the focus, while at the same time, by utilizing the catalytic effect of microthermal heating of picosecond laser irradiation on chemical corrosion was studied by using, the isolation of the sapphire sample along the processing path is obtained.

SUMMARY

In view of the deficiencies in the above problems, the invention discloses a method for high precision laser processing of sapphire with submicron roughness cutting surface.

To achieve the above objectives, the invention discloses a method for high precision laser processing of sapphire with submicron roughness cutting surface. The method includes:

Step 1, based on the high transmittance of sapphire to a certain wavelength laser beam, a laser beam of this certain wavelength is entered into the interior of sapphire and focused on a bottom surface of sapphire.

Step 2, put the sapphire and a sapphire-clamping device that holds the sapphire into a container containing a chemical etching solution, a top surface of the sapphire is flush with the liquid level. A thin sheet having a high transmittance to the incident wavelength only playing the role of beam guiding is placed on the top surface of the sapphire. The bottom surface of the sapphire is not in contact with the bottom of the container.

Step 3, picosecond-order pulse width laser is used to irradiate the sapphire in step 2. Before irradiation, the laser processing power is preset based on the threshold of self-focusing effects. The amount of lost energy caused by absorption by the sapphire during laser irradiation is calculated and is compensated to the preset laser processing power. Based on strong transient Fourier heat conduction theory, the laser energy is controlled to exceed the threshold that leads to phase transition or electronic state removal of sapphire and excites self-focusing effect that is nonlinear. This laser energy is focused on the bottom of sapphire. The generated phase transition point or electronic state removal point has a line width far less than of a diameter of the focused laser beam.

Step 4, elevating focal points of the laser beam to guide the ultrafine phase transition point or electronic state removal point extending from the bottom surface to top surface of sapphire along with the incident direction of laser beam. A trace of ultrafine phase transition or electronic state removal points is formed.

Step 5, measuring the line width of the formed trace, calculate how much the laser irradiation points are needed to complete the processing path based on the length of processing path, line width and horizontal overlapping rate of the trace.

Step 6, based on laser frequency and pulse number on single laser irradiation point, setting the suitable moving speed of laser beam. The requirement of the moving speed of laser beam is that after all preset pulses on single laser irradiation point are injected into it, the laser beam is moved to the next point.

Step 7, setting the point of ultrafine phase transition or electronic state removal point obtained in step 3 as the starting point of laser processing path by software and compiling a program based on laser processing power determined in step 3 and parameters obtained in steps 4, 5, 6.

Step 8, irradiation of sapphire along with the processing path based on steps 1-7 to complete the cutting of sapphire.

Step 9, after the laser irradiation is over, removing the containing from the irradiation location and letting sapphire standing undisturbed in the container. The sapphire cut along the processing path is obtained.

As a further improvement of the present invention, in step 2, the chemical etching solution is a hydrofluoric acid solution with the mass fraction ranges from 20%-40%.

As a further improvement of the present invention, in step 3, the processing power of the picosecond pulse width laser after compensation ranges from 5 W-15 W.

As a further improvement of the present invention, in step 5, the horizontal overlapping rate ranges from 20%-50%.

As a further improvement of the present invention, in step 6, the laser frequency mentioned above ranges from 200 KHz-1 MHz, a number of laser pulses at the single laser irradiation point ranges from 2000-4000, and the moving speed of the laser beam ranges from 1 mm/s-10 mm/s.

As a further improvement of the present invention, in step 9, the standing time ranges from 12 hours-24 hours.

Compared with existing technologies, the beneficial effects of the present invention are:

The invention provides a method for high precision laser processing of sapphire with submicron roughness cutting surface. The laser processing requires only regular focusing optical components without the need of optical components with special focusing properties. The catalytic effect of microthermal effect of picosecond laser irradiation on chemical corrosion is used to prevent heating of water bath during the corrosion process. The invention overcomes the limitation of Gaussian focusing mode to achieve high precision cutting of sapphire with a near-zero tapered edge and no heat affected zone. It can directly realize the ultrafine and high precision cutting of sapphire with high surface quality in micron and submicron ranges without the limitation of processing path.

BRIEF DESCRIPTION OF THE DRAWINGS

FIG. 1 is a confocal image of a submicron cutting surface of a sapphire obtained by the high precision laser processing method of the invention, in accordance with an embodiment.

DETAILED DESCRIPTION OF THE PREFERRED EMBODIMENTS

To make the technical scheme and advantages of the embodiment of the invention are clearer, the technical scheme is described clearly and completely based on the embodiments of the invention in conjunction with the attached drawing. Apparently, embodiments described are part of the embodiments of the present invention, instead of all embodiments.

Embodiments based on the invention and other embodiments obtained by ordinary technical personnel in this field without creative work all belong to the scope of protection of the invention.

To solve the existing technical problems, to achieve fine cutting for high hard, brittle and anti-corrosion of sapphire single crystal and similar hard, brittle materials, the invention provides a high precision laser processing method to obtain sapphire with submicron roughness cutting surface. The method adopts a picosecond pulse width laser as a self-focusing nonlinear effect light source. The self-focusing nonlinear overcomes the restrictions of beam Gaussian focusing mode. According to cutting path requirements, the picosecond pulse width laser produces a trace for ultrafine phase change points or electron state removal portions in sapphire through process design. Utilizing different corrosion effects of chemical corrosion on the trace region and the raw material region, micro- and submicron-high-quality surface cutting is obtained. The method of the invention can be applied to high precision sapphire laser cutting with various thickness and paths requirements and to effectively prevent cutting taper.

The invention will be described in more detail accompanied by the attached FIGURE:

The invention relates to laser a field of non-ablation cutting processing of hard, brittle transparent materials, especially relates to a high precision laser processing method of sapphire with submicron roughness cutting surface. The invention is suitable for sapphire fine processing with any thicknesses and shapes. A picosecond laser which has high transmittance wavelength to sapphire is used for obtaining ultra-fine phase transition point or electronic state removal point of sapphire from the bottom surface of the material. After elevating focal points of the laser, a trace is formed in a direction parallel to the laser incident direction. Points of the laser trace are arranged to intersect with other another according to the cutting path in a chemically corrosive environment. At the same time as the formation of phase change region or electronic state removal region that is consistent with the cutting path utilizing the catalytic effect of microthermal effect of picosecond laser irradiation on chemical corrosion, the separation of the sapphire sample along the processing path is obtained.

The method includes:

Step 1, based on the high transmittance of sapphire to a certain wavelength, a laser beam of this certain wavelength is entered into the interior of sapphire and focused on a bottom surface of sapphire. The incident angle of the laser beam can be determined according to the required cutting angle as designed.

Step 2, a sapphire workpiece and sapphire fixture are put into a container containing a chemical etching solution. The sapphire workpiece is positioned such that a top surface of the sapphire workpiece is flush with the liquid level and the bottom surface of sapphire workpiece does not touch the container. A thin sheet having a high transmittance only to the incident wavelength is placed on the top surface of the sapphire workpiece to suppress evaporation of chemical etchant during laser irradiation. In some embodiments, the chemical etching solution is a hydrofluoric acid solution with a mass fraction of 20%-40%. The leveled sapphire workpiece and chemical etching solution can avoid the scattering of the laser beam by the chemical etching solution. If the sapphire is immersed in the chemical etching solution, since chemical etching solution has heat dissipation effects to the sapphire workpiece, the energy of the laser beam cannot guarantee the processing of sapphire, in some instances. If the top surface of the sapphire workpiece is above the chemical etchant level, a portion of the workpiece between the surface of the chemical etching solution, and the top surface of the sapphire workpiece cannot be etched.

Step 3, a picosecond pulse width laser is used to irradiate the sapphire workpiece in step 2. Before irradiation, the laser processing power is preset set based on the threshold of self-focusing effects. The amount of lost energy caused by micro-absorption of the sapphire workpiece during laser irradiation is calculated and is used to compensate the present laser processing power. Based on strong transient Fourier heat conduction theory, the laser energy is controlled to exceed the threshold that leads to phase transition or electronic state removal of sapphire workpiece, so as to excite self-focusing nonlinear effect, thereby generating ultrafine phase transition point or electronic state removal point having a line width far less than a diameter of the focused laser beam. The picosecond pulse width laser power after compensation is from 5 W-15 W.

Step 4, the laser focal points are elevated to guide the ultrafine phase transition point or electronic state removal point extending from the bottom surface to top surface of the sapphire workpiece along the direction of incident laser beam. A trace of ultrafine phase transition or electronic state removal portions is formed. The trace is used as a starting point of processing path.

Step 5, the line width B of the trace formed in step 4 is measured. The laser irradiation points N required to complete the path is calculated based on the length A of processing path, line width B of the trace, and horizontal overlapping rate C of the trace, $N=AB/(1-C/2)$. The horizontal overlapping rate is 20%-50%.

Step 6, based on laser frequency and a number of laser pulses on a single laser irradiation point, a suitable moving speed of laser beam is set. The laser beam moving speed is controlled such that only after all preset pulses on the single laser irradiation point are injected into it, the laser beam moves to the next point. Laser frequency D of picosecond pulse width laser mentioned above ranges from 200 KHz-1 MHz. The number of laser pulses at single laser irradiation point E ranges from 2000-4000. The moving speed of laser beam is defined by $F=2BD(1-C)/E$, and ranges from 1 mm/s-10 mm/s.

Step 7, a trace of ultrafine phase transition or electronic state removal points obtained by CCD monitoring technique in step 3 is used as the starting point for laser processing path. A computer program is compiled based on laser processing power determined in step 3 and parameters obtained in steps 4, 5, 6.

Step 8, irradiation of sapphire workpiece is performed along the processing path based on steps 1-7. In addition, the cutting uses the catalytic effect of microthermal effect of picosecond laser irradiation on chemical corrosion.

Step 9, after the laser irradiation is over, the container is removed from the irradiation location. The sapphire workpiece is letting standing undisturbed in the container for 12-24 hours. Sapphire workpiece being cut along the processing path is obtained.

The above steps 1-9 are correlated processes. The processing sequence from steps 1 to 9 cannot be changed, and this technique cannot be implemented if any of the steps is absent or any change in the processing sequence occurs. The invention overcomes the limitation of Gaussian focus mode to achieve high precision cutting of sapphire with near-zero taper and no heat affected zone; it can directly realize the ultrafine and high precision cutting of sapphire with the high surface quality in micron and submicron ranges without the limitation of the processing path.

The invention is optimized for the following conditions: the laser processing power with picosecond pulse width laser after compensation is 7 W, the horizontal overlapping rate is 20%, the frequency is 200 kHz, each pulse train contains 2,400 pulses (i.e., the number of laser pulses at the single laser irradiation point is 2400), and matching processing rate of the laser beam is 1.5 mm/s. FIG. 1 shows a confocal image of a submicron level cut surface of sapphire obtained by laser processing with the above parameters; the surface roughness can reach 400 nm.

The invention provides a method of high precision laser processing of sapphire with submicron roughness cutting surface. The laser process requires only regular focusing components without the need for additional optical components with special focusing properties. The catalytic effect of microthermal effect on chemical corrosion is used to avoid the water bath heating in the process of corrosion. The invention overcomes the limitation of Gaussian focus mode to achieve high precision cutting of sapphire with near-zero taper and no heat affected zone. It can directly realize the ultrafine and high precision cutting of sapphire with high surface quality in micron and submicron ranges without the limitation of processing path.

Above is only the optimal embodiment of the invention, it is not intended to limit the invention, for technical personnel in this field, the invention has various changes. In the spirit and principle of the present invention, any changes, equivalent replacements, and improvements shall be included within the scope of protection of the present invention.

What is claimed is:

1. A method for high precision laser processing of sapphire having a submicron order section plane, comprising:
    step 1, projecting a laser beam into the sapphire and focusing the laser beam on a bottom surface of the sapphire, wherein the sapphire has a capacity for transmittance of the laser at an incident wavelength of the laser beam;
    step 2, putting the sapphire and a sapphire clamping device that holds the sapphire into a container comprising a chemical etching solution, wherein the sapphire is positioned such that a top surface of the sapphire is flush with the chemical etching solution and the bottom surface of the sapphire is above a bottom of the container, and a sheet having a transmittance to the incident wavelength and only transmitting the incident wavelength is placed on the top surface of the sapphire;

step 3, irradiating the sapphire in step 2 with the laser beam having a picosecond-order pulse width, wherein before the irradiating the sapphire, step 3 further comprises: setting power for the laser beam based on a threshold of a self-focusing effect of the sapphire, calculating an amount of lost energy of the laser beam caused by absorption of the sapphire during laser incident, compensating the preset power of the laser beam based on the calculated amount of the lost energy based on a transient Fourier heat conduction theory, controlling the power of the laser beam that is focused on the bottom surface of the sapphire above a threshold that induces a phase transition or an electronic state removal of the sapphire, the laser beam excites the self-focusing effect of the sapphire wherein the self-focusing effect is nonlinear, and generating an phase transition point or an electronic state removal point having a line width that is less than a diameter of the focused laser beam;

step 4, elevating focal points of the laser beam to guide the phase transition point or the electronic state removal point extending from the bottom surface of the sapphire to the top surface of the sapphire along an incident direction of the laser beam, thereby forming a trace of phase transition points or electronic state removal points;

step 5, measuring a line width of the trace, calculating an irradiation point of the laser beam required for completing a laser processing path based on a length of the laser processing path, the line width and a horizontal overlapping rate of the trace;

step 6, based on a frequency of the laser beam and a number of laser pulses at a single irradiation point, setting a moving speed of the laser beam, wherein the moving speed of the laser beam is controlled such that only after all pulses in the preset number of the laser pulses are injected into the single irradiation point, the laser beam moves to a next point;

step 7, using the phase transition point or the electronic state removal point obtained in step 3 as a starting point for the laser processing path, writing a computer program based on the processing power of the laser beam determined in step 3 and parameters obtained in step 4, 5, 6;

step 8, irradiating the sapphire along with the laser processing path based on step 1-7;

step 9, after irradiation, removing the container having the sapphire therein from the irradiation path and letting the sapphire standing undisturbed in the container until the sapphire is separated along the laser processing path.

2. The method of claim 1, wherein in step 2, the chemical etching solution is a hydrofluoric acid solution with a mass fraction ranging from 20%-40%.

3. The method of claim 1, wherein in step 3, the power of the laser beam having the picosecond-order pulse width after compensation ranges from 5 W-15 W.

4. The method of claim 1, wherein in step 5, the horizontal overlapping rate of the trace ranges from 20%-50%.

5. The method of claim 1, wherein in step 6, the frequency of the laser beam ranges from 200 KHz-1 MHz, the number of the laser pulses at the single irradiation point ranges from 2000-4000, and the moving speed of the laser beam ranges from 1 mm/s-10 mm/s.

6. The method of claim 1, wherein in step 9, a standing time ranges from 12 hours-24 hours.

\* \* \* \* \*